US009874938B2

(12) United States Patent
Murase

(10) Patent No.: US 9,874,938 B2
(45) Date of Patent: Jan. 23, 2018

(54) INPUT DEVICE AND DETECTION METHOD

(71) Applicant: FUJITSU LIMITED, Kawasaki-shi, Kanagawa (JP)

(72) Inventor: Taichi Murase, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 52 days.

(21) Appl. No.: 14/887,817

(22) Filed: Oct. 20, 2015

(65) Prior Publication Data
US 2016/0132121 A1 May 12, 2016

(30) Foreign Application Priority Data
Nov. 10, 2014 (JP) .................................. 2014-228154

(51) Int. Cl.
G06F 3/03 (2006.01)
G06F 3/01 (2006.01)
G06F 3/0488 (2013.01)
G06F 3/041 (2006.01)
G06F 3/042 (2006.01)
G06T 7/73 (2017.01)
(Continued)

(52) U.S. Cl.
CPC ............ G06F 3/017 (2013.01); G06F 3/0304 (2013.01); G06F 3/0416 (2013.01); G06F 3/0425 (2013.01); G06F 3/0488 (2013.01); G06K 9/00389 (2013.01); G06K 9/4604 (2013.01); G06T 7/73 (2017.01); G06F 2203/04101 (2013.01); G06T 2207/10028 (2013.01)

(58) Field of Classification Search
CPC ...... G06F 3/017; G06F 3/0304; G06F 3/0416; G06F 3/0425; G06F 3/0488; G06F 2203/04101
See application file for complete search history.

(56) References Cited

U.S. PATENT DOCUMENTS

2011/0102570 A1* 5/2011 Wilf ...................... G06F 3/017
348/77
2012/0050194 A1* 3/2012 Tanaka .................. G06F 3/0425
345/173
(Continued)

FOREIGN PATENT DOCUMENTS

JP 2003-346162 12/2003
JP 2006-277666 10/2006
JP 2011-22945 2/2011

Primary Examiner — Md Saiful A Siddiqui
(74) Attorney, Agent, or Firm — Staas & Halsey LLP

(57) ABSTRACT

An input device includes: a memory configured to store a length of a finger; and a processor configured to obtain a depth image that includes a hand and has pixel values corresponding to a distance from a camera to subjects including the hand, detect a hand area that corresponds to the hand from among the subjects, from the depth image, identify a tip end of the hand area and a base of the finger, identify a first three-dimensional position that corresponds to the tip end and a second three-dimensional position that corresponds to the base, based on the pixel values of the depth image, identify a direction from the second three-dimensional position to the first three-dimensional position, calculate a third three-dimensional position that corresponds to a fingertip of the finger based on the direction and the length, and generate an input signal according to the third three-dimensional position.

18 Claims, 11 Drawing Sheets

(51) Int. Cl.
    *G06K 9/00*           (2006.01)
    *G06K 9/46*           (2006.01)

(56) References Cited

U.S. PATENT DOCUMENTS

| | | | | |
|---|---|---|---|---|
| 2012/0056730 | A1* | 3/2012 | Ujiie | G06F 3/03547 340/12.22 |
| 2013/0314380 | A1* | 11/2013 | Kuribayashi | G06F 3/0425 345/175 |
| 2013/0342459 | A1* | 12/2013 | Karakotsios | G06F 3/0418 345/159 |
| 2016/0054859 | A1* | 2/2016 | Oshima | G06F 3/0425 345/175 |

\* cited by examiner

INPUT DEVICE AND DETECTION METHOD

CROSS-REFERENCE TO RELATED APPLICATION

This application is based upon and claims the benefit of priority of the prior Japanese Patent Application No. 2014-228154, filed on Nov. 10, 2014, the entire contents of which are incorporated herein by reference.

FIELD

The embodiments discussed herein are related to, for example, a technology by which an input signal is generated depending on a result obtained by analyzing a depth image indicating a distance between a camera and a hand.

BACKGROUND

In a related art, as an input device through which a user inputs desired information, a keyboard including a plurality of keys is used. The keyboard is excellent in convenience for the user to input desired information, but it is desirable that the keyboard has a certain size in order to include a plurality of keys each having the size that allows the user to operate the key. For example, a keyboard having so-called QWERTY key arrangement includes at least 26 keys that correspond to respective alphabetical letters.

In addition, a user interface by which a human operation is recognized, and desired information is input has been studied. For example, an input system discussed in Japanese Laid-open Patent Publication No. 2003-346162 recognizes which finger is extended by recognizing the shape of a hand from an input image, and input of an instruction or the like is performed based on the recognition result.

SUMMARY

According to an aspect of the invention, an input device includes: a memory configured to store a length of a finger; and a processor coupled to the memory and configured to obtain a depth image that includes a hand and has pixel values corresponding to a distance from a camera to subjects including the hand, detect a hand area that corresponds to the hand from among the subjects, from the depth image, identify a tip end of the hand area and a base of the finger, identify a first three-dimensional position that corresponds to the tip end and a second three-dimensional position that corresponds to the base, based on the pixel values of the depth image, identify a direction from the second three-dimensional position to the first three-dimensional position, calculate a third three-dimensional position that corresponds to a fingertip of the finger based on the direction and the length, and generate an input signal according to the third three-dimensional position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A depth image camera is known that generates a depth image in which each pixel has a pixel value corresponding to a distance to a subject that appears in the pixels. The position and the shape of the subject in the real space, which appears in the depth image, may be identified by analyzing the depth image generated by imaging the subject using the depth image camera. However, it may be difficult to identify a fingertip in the depth image that has been obtained by imaging a hand, depending on an imaging environment or the like. In such a case, the fingertip position is not identified accurately, so that there is a possibility that information different from information desired by the user is input to the input device.

Therefore, an object of the technology discussed in the embodiment is to provide an input device that detects the fingertip position even when it is difficult to identify the fingertip on the depth image.

The input device is described below with reference to diagrams. Such an input device detects a position at which the fingertip of a user has touched a table, from a depth image obtained by imaging the hand of the user using the depth image camera, and generates an input signal corresponding to the position.

Figure 1:
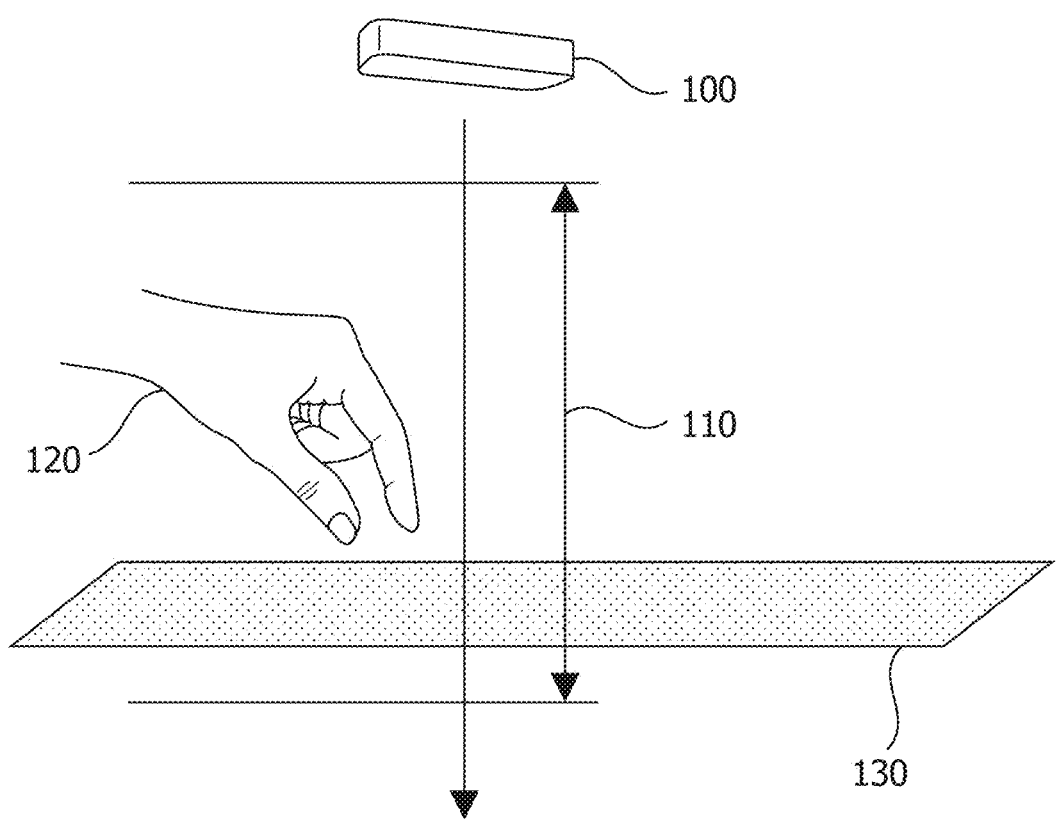
FIG. 1 is a diagram illustrating a range of a distance that a depth image camera is able to represent on a depth image.

FIG. 1 is a diagram illustrating a range of a distance that a depth image camera is able to represent on a depth image. For a hand 120 of the user, which is a subject in a certain distance range 110, a depth image camera 100 generates a depth image having pixel values depending on a distance to the hand 120. For example, as the distance to the hand 120 becomes larger, the values of the corresponding pixels on the depth image also become larger (that is, the pixels become white as the distance becomes farther).

Here, for example, it is assumed that a table 130 is provided at the position farther from the depth image camera 100 than the hand 120, as the surface on which the finger touches when the user performs an input operation. In this case, on the depth image, pixels in which the table 130 appears and pixels in which the hand 120 appears have different pixel values.

Figure 2A:
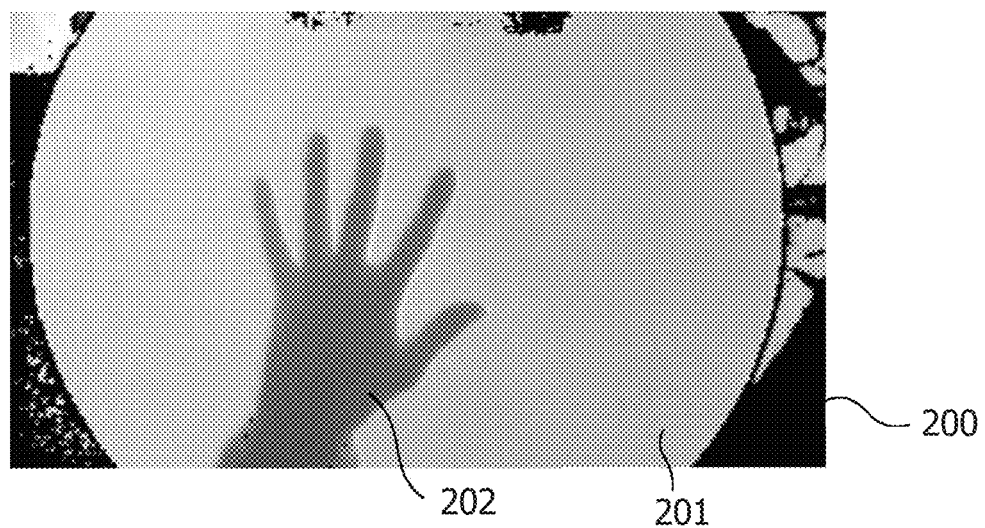
FIG. 2A is a diagram illustrating a depth image of a hand away from a table, which is obtained by the depth image camera.

FIG. 2A is a diagram illustrating a depth image of a hand away from a table, which is obtained by the depth image camera. In a depth image 200, a table 201 located relatively far from the depth image camera is represented relatively white, and a hand 202 located relatively near the depth image camera is represented relatively black. As described above, when the table 201 and the hand 202 are separated from each other, differences between the values of pixels included in the area in which the hand 202 appears and the values of pixels included in the surrounding area in which the table 201 appears become large on the depth image 200. Therefore, the fingertip position may be accurately identified on the depth image 200.

On the contrary, for example, when the user put the hand close to the table in order to perform an input operation, a difference between a distance from the depth image camera to the hand and a distance from the depth image camera to the table becomes small. Therefore, in the depth image, differences between the pixel values of pixels in which the table appears and the pixel values of pixels in which the hand appears become small.

Figure 2B:
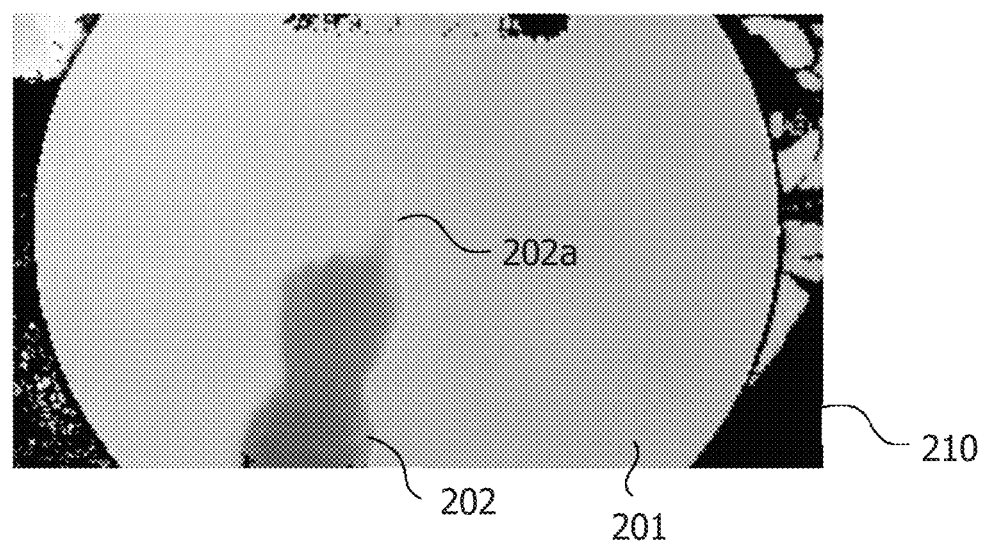
FIG. 2B is a diagram illustrating a depth image when an index finger has come into contact with the table surface.

FIG. 2B is a diagram illustrating a depth image when an index finger has come into contact with the table surface. In a depth image 210, a difference between a distance from the depth image camera to the fingertip of the index finger and a distance from the depth image camera to the table 201 is small, so that it is difficult to identify the fingertip of an index finger 202a of the hand 202 in the depth image 210.

Therefore, the input device according to the embodiment obtains, in advance, the length of a finger from the finger base to the fingertip, which is used for an input operation by the user (for example, an index finger), based on a depth image obtained by capturing the finger by the depth image camera in a state in which the finger is away from the background, and stores the length in the storage unit. In addition, for example, when the input device detects an input operation, the input device sets, as the fingertip position, the position separated from the finger base by the length of the finger, which is stored in advance, in the longitudinal direction of the finger, which has been obtained on the depth image from the finger base and a portion in which the finger is identified.

Figure 3:
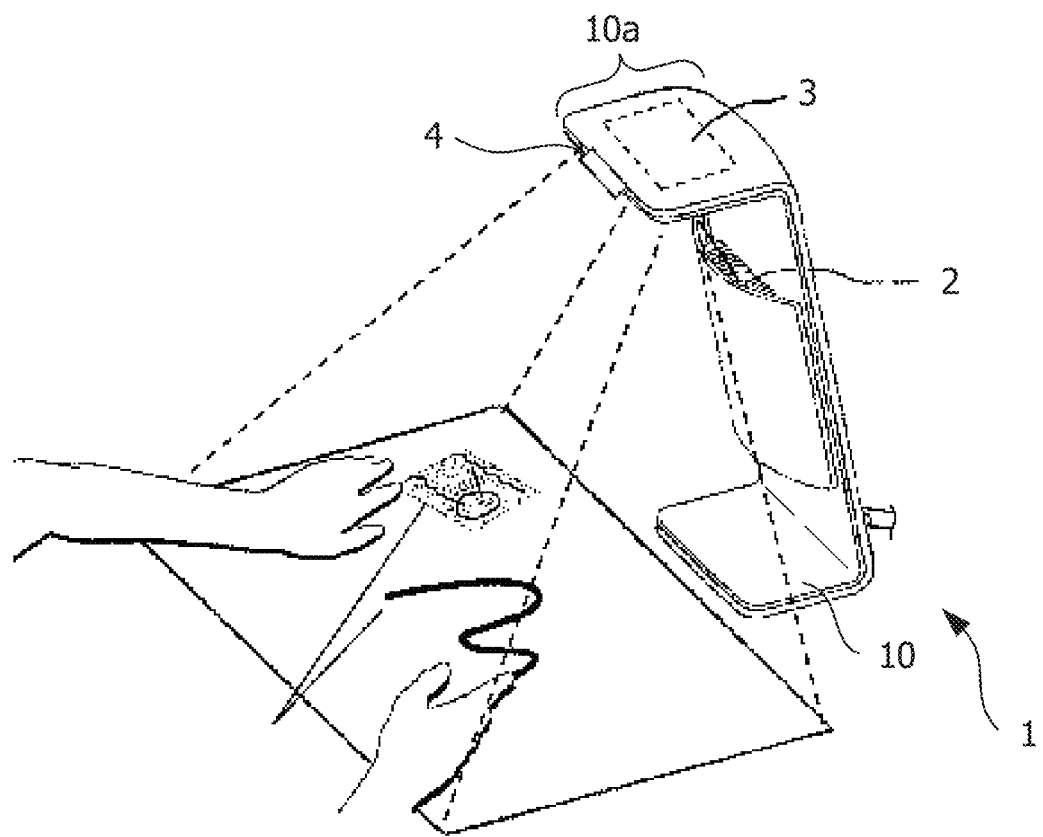
FIG. 3 is a schematic perspective view of an input device.
Figure 4:
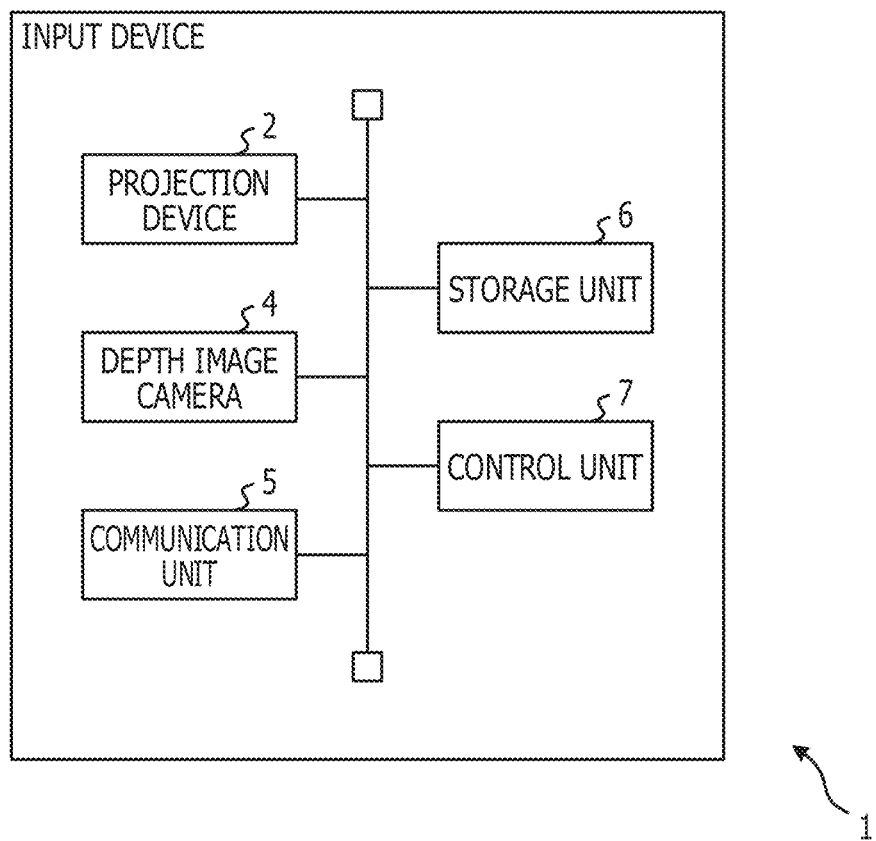
FIG. 4 is a hardware configuration diagram of the input device illustrated in FIG. 3.

FIG. 3 is a schematic perspective view of an input device. FIG. 4 is a hardware configuration diagram of the input device illustrated in FIG. 3. An input device 1 includes a projection device 2, a mirror 3, a depth image camera 4, a communication unit 5, a storage unit 6, and a control unit 7. The units included in the input device 1 are accommodated in a housing 10 having a U-shaped in a vertical direction viewed from the side surface. In the following description, for convenience of explanation, the surface of the input device, which faces the user, is referred to as a front surface.

The projection device 2 is, for example, a liquid-crystal projector, and is provided on the front surface side of the housing 10 so that the display surface faces upward. The projection device 2 projects video so as to display video on the display surface, in accordance with a video signal that has been received from the control unit 7. The video from the projection device 2 is, for example, projected on the table surface or the like on which the housing 10 is provided so as to be reflected by the mirror 3 provided on the lower side of a top part 10a of the housing 10, which protrudes into the front surface side.

The depth image camera 4 is an example of a depth image generation unit, and is provided in the top part so as to face downward so that the imaging range includes a range in which the video that has been projected from the projection device 2 appears. It is desirable that the depth image camera 4 is provided so that the surface of the table on which the housing 10 is mounted is included within the distance range in which the distance is represented as pixel values on the depth image. In addition, the depth image camera 4 generates a depth image in which the imaging range appears, at certain imaging cycles (for example, 30 m sec to 100 m sec). In addition, the depth image camera 4 outputs a depth image to the control unit 7 each time the depth image camera 4 generates the depth image.

The communication unit 5 includes an interface used to connect the input device 1 to a further device and a control circuit of the interface. In addition, for example, the communication unit 5 transmits a video signal that has been received from a further device, to the control unit 7. Alternatively, the communication unit 5 outputs, to a further device, an input signal that has been received from the control unit 7, which corresponds to an input from the user.

The storage unit 6 includes, for example, a volatile or nonvolatile semiconductor memory circuit. In addition, the storage unit 6 stores a video signal indicating a video projected by the projection device 2, various pieces of information used to detect an input operation from the user, for example, information used to detect the fingertip position of the user from the depth image.

The control unit 7 includes one or a plurality of processors and the peripheral circuit. In addition, the control unit 7 is coupled to the projection device 2, the depth image camera 4, the communication unit 5, and the storage unit 6 through a signal line, and controls the entire input device 1. In addition, the control unit 7 detects the fingertip position of the user by analyzing the depth image that has been received from the depth image camera 4. In addition, the control unit 7 detects an input from the user, based on the fingertip position, and generates an input signal corresponding to the input.

Figure 5:
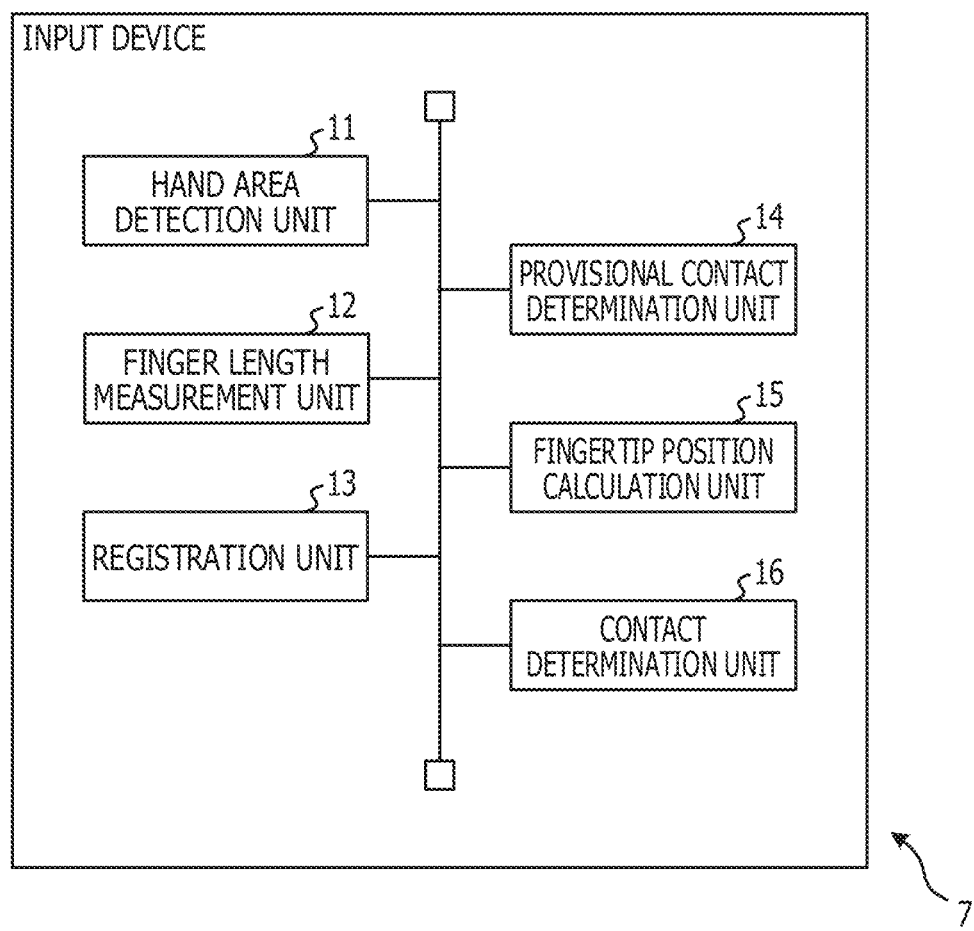
FIG. 5 is a functional block diagram of a control unit.

A configuration element related on input processing including fingertip position detection processing, which is executed by the control unit 7 is described below in detail. FIG. 5 is a functional block diagram of the control unit 7. The control unit 7 includes a hand area detection unit 11, a finger length measurement unit 12, a registration unit 13, a provisional contact determination unit 14, a fingertip position calculation unit 15, and a contact determination unit 16. Each of the units included in the control unit 7 may be provided, for example, as a function module achieved by a computer program executed on a processor included in the control unit 7. The units may be provided in the input device 1 as a separate circuit, independent of the control unit 7, or may be provided in the input device 1 as a single integrated circuit that achieve the functions of the units, independent of the control unit 7.

The finger length measurement unit 12 and the registration unit 13 are used for registration processing in which registration of the length of a certain finger of the user, and a reference image that is a depth image when an object that is a target to be touched is merely included in within the imaging range of the depth image camera 4 is performed in a case in which the user performs an input operation. In addition, the provisional contact determination unit 14, the fingertip position calculation unit 15, and the contact determination unit 16 are used for input processing. In addition, the hand area detection unit 11 is used for both of the registration processing and the input processing.

(Registration Processing)

The units related to the registration processing are described below. At first, in a case in which the user performs an input operation, the control unit 7 obtains, from the depth image camera 4, a depth image when an object that is a target to be touched is merely included in the imaging range. In addition, the depth image is transmitted to the registration unit 13. The registration unit 13 stores the depth image in the storage unit 6 as a reference image. The object that is the target to be touched when the user performs the input operation is, for example, a table on which the input device 1 has been mounted. In the following description, for convenience of explanation, the object that is the target to be touched when the user performs the input operation is referred to as a reference object. Each pixel of the reference image has a pixel value corresponding to a distance between the position of the reference object corresponding to the pixel and the depth image camera 4.

After that, the control unit 7 obtains, from the depth image camera 4, a depth image that has been obtained by imaging the hand of the user in a state in which the hand of the user is located over the reference object and closer to the depth image camera 4 than the reference object within the imaging range. At that time, it is desirable that the hand of the user is in the state in which merely a finger that touches the reference object is extended outward at the time of the input operation, and the other fingers are bent. In addition, the control unit 7 transmits the depth image to the hand area detection unit 11.

The hand area detection unit 11 detects a hand area that is an area in which the hand appears on the depth image. Therefore, the hand area detection unit 11 calculates a difference absolute value between the pixel value of each of the pixels of the depth image and the pixel value of each of the corresponding pixels of the reference image. In addition, the hand area detection unit 11 obtains a difference image in which each of the pixels has each of the difference absolute values.

The hand is closer to the depth image camera 4 than the reference object, so that differences between the pixel values of the pixels in which the hand appears and the pixel values of the corresponding pixels of the reference image are relatively large values. On the contrary, the pixel values of pixels in which the hand does not appear are identical to the pixel values of the corresponding pixels of the reference image. Therefore, the hand area detection unit 11 generates a binary image including different values corresponding to pixels, the pixel values of which are equal to or more than a certain binarization threshold value, and pixels, the pixel values of which are less than the binarization threshold value, by comparing the pixel values with the binarization threshold value, for each of the pixels of the difference image. Thus, in the binarization image, aggregate of pixels in which the pixel values of the difference image are the binarization threshold value or more corresponds to the hand area. The certain binarization threshold value may be a value that has been set in advance, or a value obtained from a statistic amount of the pixel values of the difference image, for example, an average value or a median value the pixel values of the difference image. The hand area detection unit 11 transmits the binary image of the hand area to the finger length measurement unit 12.

The finger length measurement unit 12 measures the length of the finger that touches the reference object at the time of the input operation, from the hand area.

Figure 6:
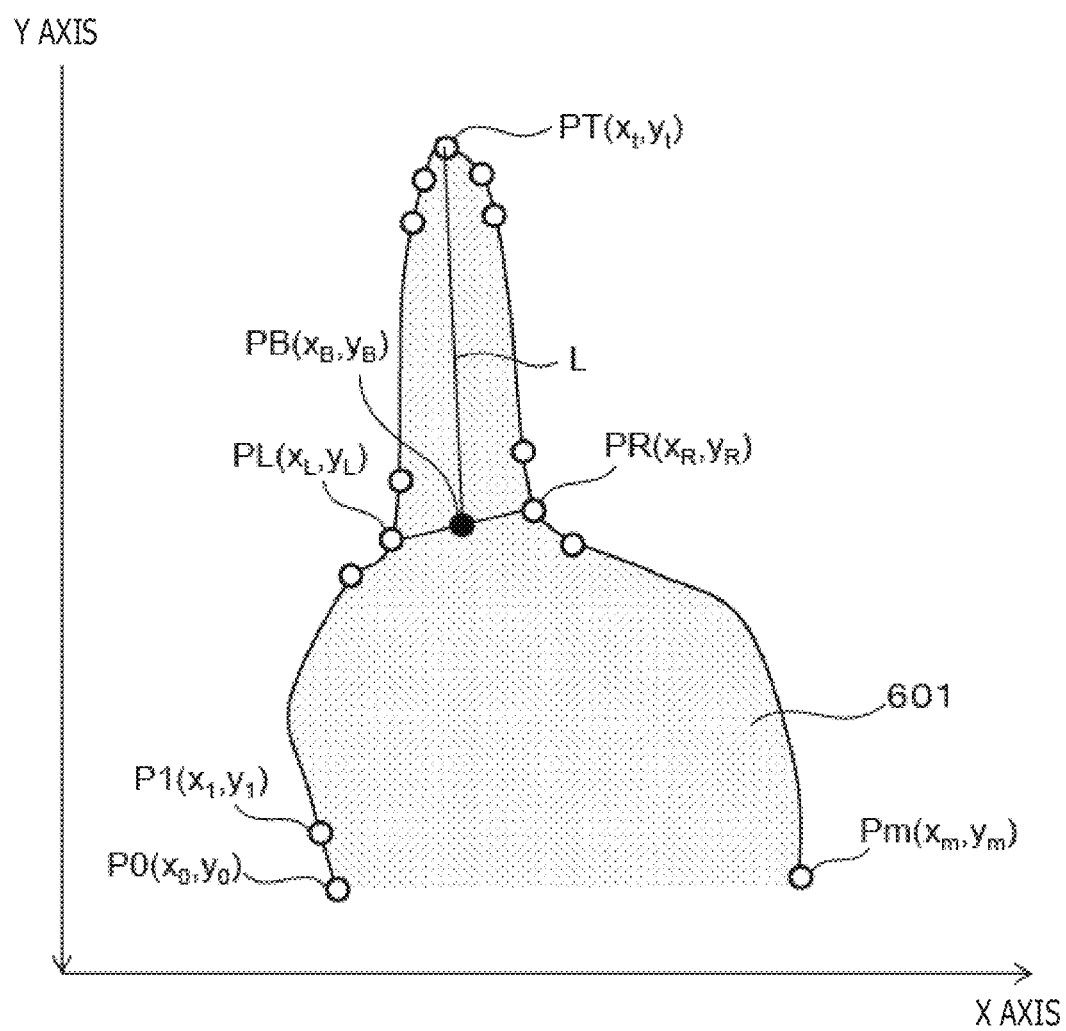
FIG. 6 is a diagram illustrating processing in which the length of the finger is detected.

FIG. 6 is a diagram illustrating processing in which the length of the finger is detected. As illustrated in FIG. 6, for the binary image indicating the hand area, which has been generated from the depth image, an x axis is set for the horizontal direction, and a y axis is set for the vertical direction. In addition, it is assumed that "x=0" is satisfied at the left edge of the binary image, and the value of "x" is increased as the value approaches the right edge. In addition, it is assumed that "y=0" is satisfied at the upper edge of the binary image, and the value of "y" is increased as the value approaches the lower edge. In this example, the hand of the user appears on the binary image in a state in which the index finger has been extended outward, and the tip end of the index finger faces upward. In the embodiment, the finger length measurement unit 12 traces a plurality of contour points Pi $(x_i, y_i)$ (i=0, 1, . . . and, m) that are pixels on the contour of the hand area 601 in order from the lower left contour point P0 $(x_0, y_0)$, and identifies the contour point located at the fingertip. After that, the finger length measurement unit 12 obtains the position of the finger base by identifying the contour point corresponding to the finger base. In addition, the finger length measurement unit 12 sets, as the length of the finger, a distance L between the position in the real space, which corresponds to the fingertip position on the binary image and the position in the real space, which corresponds to the finger base on the binary image.

The finger length measurement unit 12 detects, as the contour point, a pixel the adjacent pixel of which is included in the background area that is the area from which the hand area is removed on the binary image, from among pixels included in the hand area. In addition, the finger length measurement unit 12 sets the contour point that is the closest to the corner of the lower left end of the binary image, as the P0 $(x_0, y_0)$. In addition, the finger length measurement unit 12 sets the contour point adjacent to the P0 $(x_0, y_0)$, as "P1 $(x_1, y_1)$". Similarly, the finger length measurement unit 12 sets the contour point adjacent to the contour point Pi $(x_i, y_i)$ as "P(i+1)$(x_{i+1}, y_{i+1})$".

After that, the finger length measurement unit 12 identifies the contour point located at the fingertip. Therefore, the finger length measurement unit 12 obtains an increment in the horizontal direction and the vertical direction (ax,ay) of a line connecting the mutually-adjacent two contour points Pi $(x_i, y_i)$ and P(i+1) $(x_{i+1}, y_{i+1})$, in order from the contour point P0 $(x_0, y_0)$. However, "ax=$(x_{i+1}-x_i)$" and "ay=$(y_{i+1}-y_i)$" are satisfied. In the embodiment, the finger length measurement unit 12 obtains the increment (ax,ay) in order from the contour point closest to the lower left end of the contour of the hand area, so that "ax>0" and "ay<0" are satisfied while the contour point approaches the fingertip. In addition, the fingertip is located at the uppermost of the binary image, so that "ax>0" and "ay>0" are satisfied in the contour points on the right side of the fingertip. Therefore, the finger length measurement unit 12 sets the contour point Pi $(x_i, y_i)$ at which a distance Ct from the contour point P0 $(x_0, y_0)$ becomes a certain threshold value Th1 or more for the first time, and "ax>0" and "ay>0" are satisfied, as the contour point located at the fingertip. The number of pixels corresponding to the minimum value of the length of the finger, which is assumed on the binary image, is set as the threshold value Th1.

After that, the finger length measurement unit 12 detects the contour point on the left side of the finger and the contour point on the right side of the finger, which respectively correspond to the finger base. In the embodiment, the finger length measurement unit 12 sets the position at which a change in an inclination of the contour of the finger is large, as the contour point of the position of the finger base. Therefore, the finger length measurement unit 12 sets the contour point located at the fingertip as the PT $(x_t, y_t)$. In addition, the finger length measurement unit 12 obtains an inclination A (n) of a line connecting mutually-adjacent two contour points Pn $(x_n, y_n)$ and P(n-1)$(x_{n-1}, y_{n-1})$, in order from the contour point PT $(x_t, y_t)$ to the P0 $(x_0, y_0)$, in order to detect the contour point on the left side of the finger, which corresponds to the position of the finger base. The inclination A (n) is calculated by the following equation.

$$A(n)=|ay/ax|=|\{y_{n-1}-y_n\}/\{x_{n-1}-x_n\}| \quad (1)$$

The finger length measurement unit 12 compares an absolute value |A(n−1)−A(n)| of a difference between the inclination A (n) and the inclination A (n−1) with a threshold value Th2. In addition, the finger length measurement unit 12 sets the contour point P(n−1) ($x_{n-1},y_{n-1}$) at which an absolute value |A(n−1)−A(n)| of the difference becomes the threshold value Th2 or more for the first time, as the contour point PL ($x_L,y_L$) on the left side of the finger, which corresponds to the position of the finger base. The threshold value Th2 is set, for example, at 0.7.

Similarly, the finger length measurement unit 12 obtain an inclination A'(n) of a line connecting the mutually-adjacent two contour points Pn ($x_n,y_n$) and the P(n+1) ($x_{n+1},y_{n+1}$), in order from the contour point PT ($x_t,y_t$) to the Pm ($x_m,y_m$), in order to detect the contour point on the right side of the finger, which corresponds to the position of the finger base. The inclination A' (n) is calculated by the following equation.

$$A'(n)=|ay/ax|=|\{y_{n+1}-y_n\}/\{x_{n+1}-x_n\}| \quad (2)$$

The finger length measurement unit 12 compares an absolute value |A'(n+1)−A'(n)| of a difference between the inclination A' (n) and the inclination A' (n+1) with the threshold value Th2. In addition, the finger length measurement unit 12 sets the contour point P(n+1) ($x_{n+1},y_{n+1}$) at which the absolute value |A'(n+1)−A'(n)| of the difference becomes the threshold value Th2 or more for the first time, as the contour point PR ($x_R,y_R$) on the right side of the finger, which corresponds to the position of the finger base.

The finger length measurement unit 12 sets the middle point between the contour point PL ($x_L,y_L$) on the left side of the finger and the contour point PR ($x_R,y_R$) on the right side of the finger, which respectively correspond to the positions of the finger base, as the finger base position PB ($x_B,y_B$). In addition, the finger length measurement unit 12 sets a distance between the position in the real space, which corresponds to the finger base position PB ($x_B,y_B$) and the position in the real space, which corresponds to the contour point PT ($x_t,y_t$) of the fingertip, as the finger length L.

In the embodiment, the contour point PT ($x_t,y_t$) of the fingertip and the finger base position PB ($x_B,y_B$) are obtained on the binary image that has been generated from the depth image. Therefore, distances from the depth image camera 4 to the positions in the real space, which correspond to the PT ($x_t,y_t$) and the PB ($x_B,y_B$) are obtained from the values of the pixels corresponding to the coordinates of the PT ($x_t,y_t$) and the PB ($x_B,y_B$) on the depth image. In addition, coordinates of each of the pixels on the depth image uniquely correspond to a direction from the depth image camera 4. Therefore, the positions in the real space, which correspond to the PT ($x_t,y_t$) and the PB ($x_B,y_B$) are obtained from the distances from the depth image camera 4 to the positions in the real space, which respectively correspond to the PT ($x_t,y_t$) and the PB ($x_B,y_B$), and the coordinates of the PT ($x_t,y_t$) and the PB ($x_B,y_B$) on the depth image. The finger length measurement unit 12 transmits the finger length L to the registration unit 13.

Figure 7:
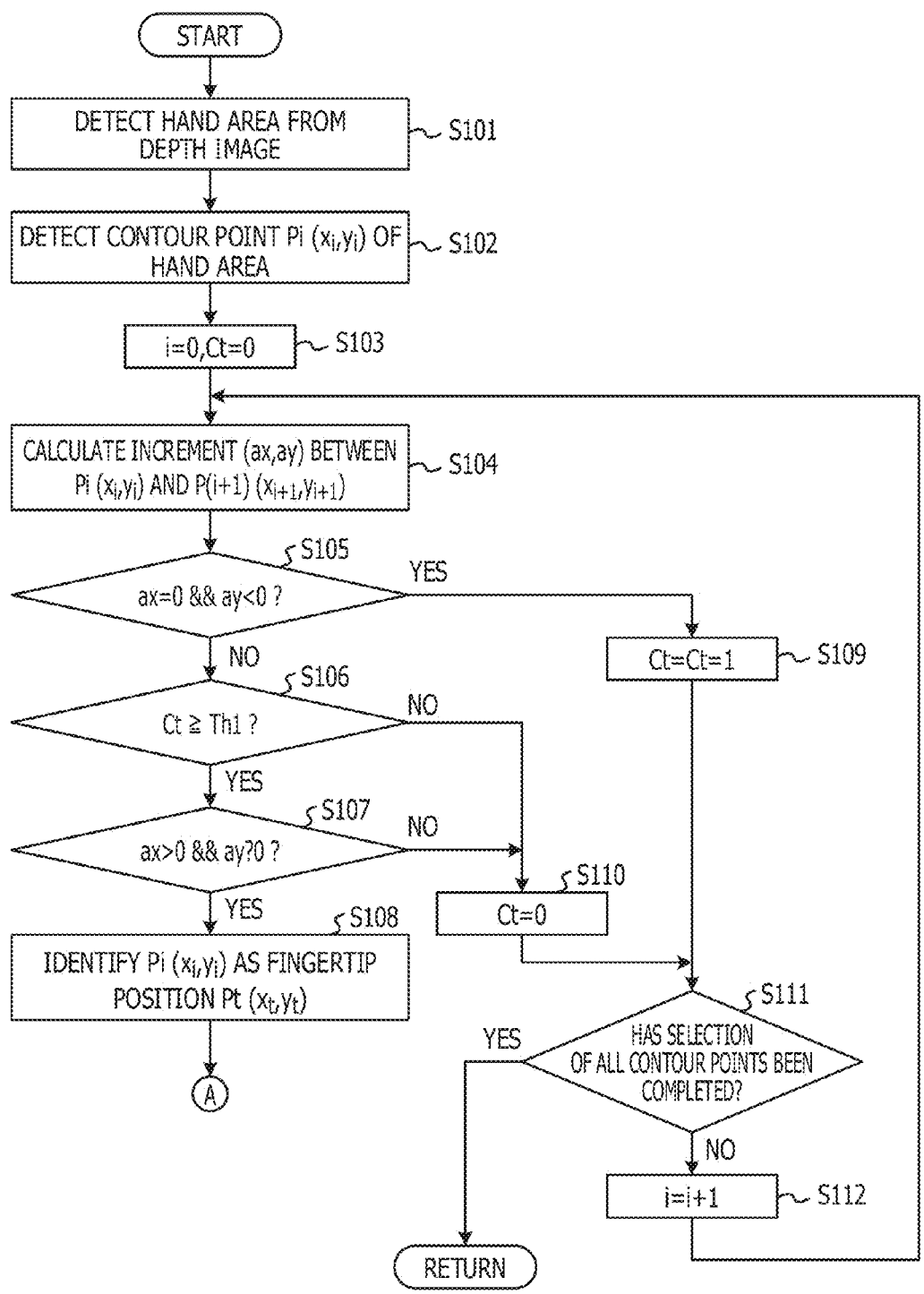
FIG. 7 is an operation flowchart illustrating finger length measurement processing.
Figure 8:
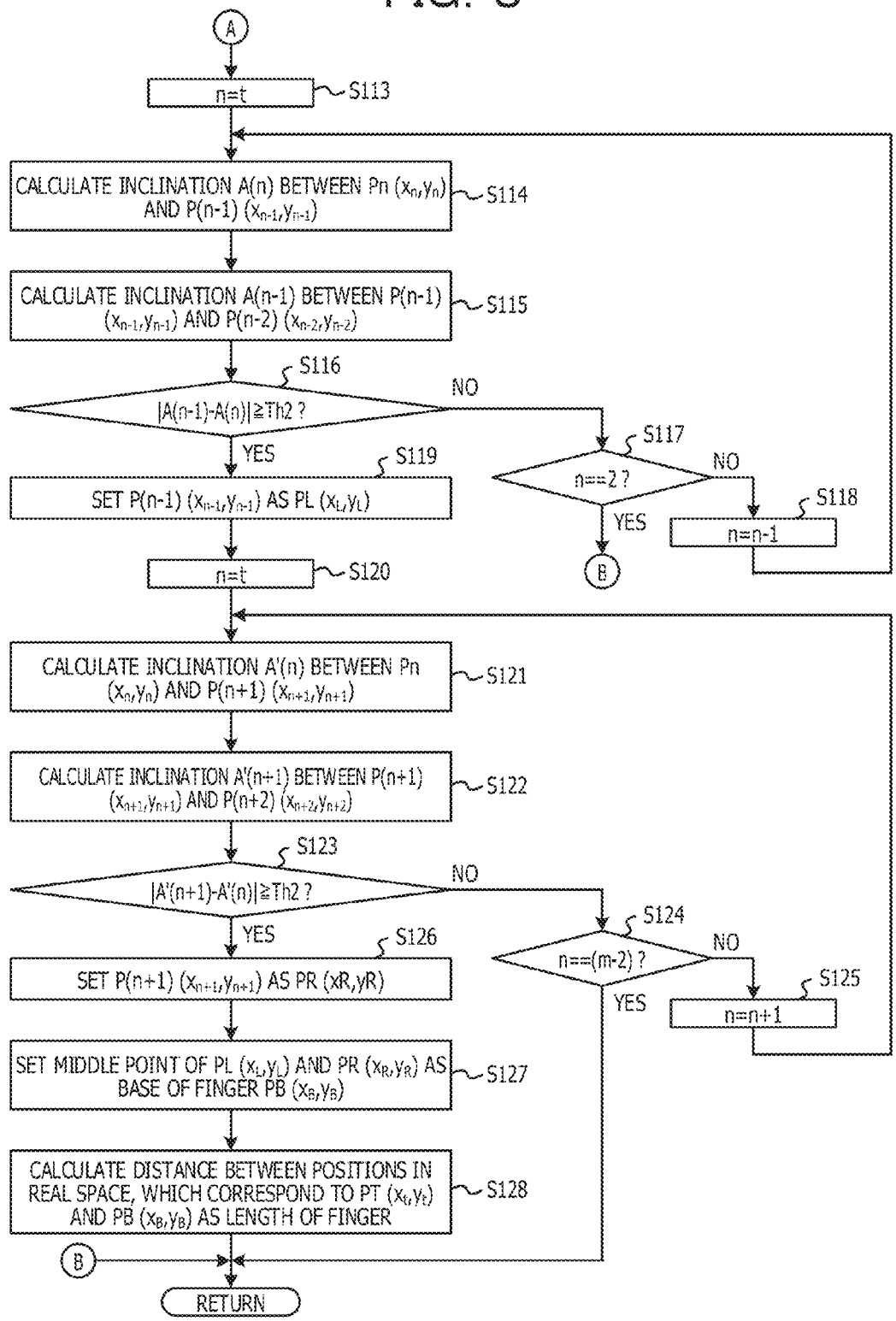
FIG. 8 is an operation flowchart illustrating the finger length measurement processing.

FIGS. 7 and 8 are operation flowcharts illustrating the finger length measurement processing. The hand area detection unit 11 detects the hand area that is an area in which the hand of the user in a depth image that has been obtained by the depth image camera 4, from the depth image (Step S101). The finger length measurement unit 12 detects the contour point Pi ($x_i,y_i$) (i=0, 1, . . . and, m) of the hand area (Step S102).

The finger length measurement unit 12 resets the distance Ct and an index i indicating the position of the contour point at 0 (Step S103). After that, the finger length measurement unit 12 selects two adjacent contour points Pi ($x_i,y_i$) and P(i+1) ($x_{i+1},y_{i+1}$), and obtains an increment (ax,ay) in the horizontal direction and vertical direction of the line connecting the two contour points (Step S104). In addition, the finger length measurement unit 12 determines whether "ax>0" and "ay<0" are satisfied (Step S105). When "ax≤0" or "ay≥0" is satisfied (Yes in Step S105), the finger length measurement unit 12 determines whether the distance Ct is the threshold value Th1 or more (Step S106).

When the distance Ct is the threshold value Th1 or more (Yes in Step S106), the finger length measurement unit 12 determines whether "ax>0" and "ay>0" are satisfied (Step S107). When "ax>0" and "ay>0" are satisfied, the finger length measurement unit 12 identifies the contour point Pi ($x_i,y_i$) as the fingertip position PT ($x_t,y_t$) (Step S108).

In Step S105, when "ax>0" and "ay<0" are satisfied (No in Step S105), the finger length measurement unit 12 adds "1" to the distance Ct (Step S109). In addition, in Step S106, when the distance Ct is less than the threshold value Th1 (No in Step S106), or when "ax≤0" or "ay≤0" is satisfied in Step S107 (No in Step S107), the finger length measurement unit 12 resets the distance Ct at 0 (Step S110).

After Step S109 or S110, the finger length measurement unit 12 determines whether all contour points have been selected (Step S111). When all of the contour points have been selected (Yes in Step S111), the finger length measurement unit 12 ends the finger length measurement processing without calculation of the length of the finger. In this case, it is desirable that the finger length measurement processing is executed, based on the depth image that has been obtained by imaging the hand of the user again.

When not all of the contour points have been selected (No in Step S111), the finger length measurement unit 12 adds "1" to the index i (Step S112). After that, the finger length measurement unit 12 repeats the processing in Step S104 and the subsequent steps.

As illustrated in FIG. 8, after the fingertip position has been identified in Step S108, the finger length measurement unit 12 identifies the left and right contour points corresponding to the positions of the finger base. Therefore, the finger length measurement unit 12 resets an index n indicating the position of the contour point at a number t of the contour point corresponding to the fingertip position (Step S113). In addition, the finger length measurement unit 12 selects the adjacent two contour points Pn ($x_n,y_n$) and P(n−1) ($x_{n-1},y_{n-1}$), and obtains an inclination A (n) of a line connecting the two contour points (Step S114). In addition, the finger length measurement unit 12 selects the adjacent two contour points P(n−1) ($x_{n-1},y_{n-1}$) and P(n−2) ($x_{n-2},y_{n-2}$), and obtains an inclination A (n−1) of a line connecting the two contour points (Step S115). In addition, the finger length measurement unit 12 determines whether an absolute value |A(n−1)−A(n)| of a difference between the inclination A (n−1) and the inclination A (n) is the threshold value Th2 or more (Step S116).

When the absolute value |A(n−1)−A(n)| is less than the threshold value Th2 (No in Step S116), the finger length measurement unit 12 determines whether the index n is "2" (Step S117). When the index n is "2" (Yes in Step S117), the contour point of the lower left edge has been already selected, so that the finger length measurement unit 12 ends the finger length measurement processing without identification of a contour point corresponding to the finger base. In this case, it is desirable that the finger length measurement processing is executed, based on the depth image that has been obtained by imaging the hand of the user again. When the index n is more than "2" (No in Step S117), the finger length measurement unit 12 subtracts "1" from the index n (Step S118). After that, the finger length measurement unit 12 repeats the processing in Step S114 and the subsequent steps.

In addition, in Step S116, when the absolute value |A (n−1)−A(n)| is the threshold value Th2 or more (Yes in Step S116), the finger length measurement unit 12 sets the contour point P(n−1) $(x_{n-1},y_{n-1})$ as the contour point PL $(x_L,y_L)$ located at the finger base on the left side (Step S119).

When the contour point PL $(x_L,y_L)$ located at the finger base on the left side is obtained, the finger length measurement unit 12 resets the index n indicating the position of the contour point at the number t of the contour point corresponding to the finger position in order to obtain the contour point PR $(x_R,y_R)$ located at the finger base on the right side (Step S120). In addition, the finger length measurement unit 12 selects the adjacent two contour points Pn $(x_n,y_n)$ and P(n+1) $(x_{n+1},y_{n+1})$, and obtains an inclination A' (n) of a line connecting the two contour points (Step S121). In addition, the finger length measurement unit 12 selects the adjacent two contour points P(n+1) $(x_{n+1},y_{n+1})$ and P(n+2) $(x_{n+2},y_{n+2})$, and obtains an inclination A' (n+1) of a line connecting the two contour points (Step S122). In addition, the finger length measurement unit 12 determines whether an absolute value |A'(n+1)−A'(n)| of a difference between the inclination A' (n+1) and the inclination A' (n) is the threshold value Th2 or more (Step S123).

When the absolute value |A'(n+1)−A'(n)| is less than the threshold value Th2 (No in Step S123), the finger length measurement unit 12 determines whether the index is "(m−2)" (Step S124). When the index n is "(m−2)" (Yes in Step S124), the contour point of the lower right edge has been already selected, so that the finger length measurement unit 12 ends the finger length measurement processing without identification of a contour point corresponding to the finger base on the right side. In this case, it is desirable that the finger length measurement processing is executed, based on the depth image that has been obtained by imaging the hand of the user again. When the index n is less than "(m−2)" (No in Step S124), the finger length measurement unit 12 adds "1" to the index n (Step S125). After that, the finger length measurement unit 12 repeats the processing in Step S121 and the subsequent steps.

In addition, in Step S123, when the absolute value |A'(n+1)−A'(n)| is the threshold value Th2 or more (Yes in Step S123), the finger length measurement unit 12 sets the contour point P(n+1) $(x_{n+1},y_{n+1})$ as the contour point PR $(x_R,y_R)$ located at the finger base on the right side (Step S126).

After that, the finger length measurement unit 12 sets the middle point of the contour point PL $(x_L,y_L)$ and the contour point PR $(x_R,y_R)$ as the finger base PB $(x_B,y_B)$ (Step S127). In addition, the finger length measurement unit 12 calculates a distance between the position in the real space, which corresponds to the fingertip position PT $(x_t,y_t)$ and the position in the real space, which corresponds to the finger base PB $(x_B,y_B)$, as the finger length L (Step S128). In addition, the finger length measurement unit 12 ends the finger length measurement processing.

The registration unit 13 stores the finger length L that has been received from the finger length measurement unit 12, in the storage unit 6. At that time, for example, when the control unit 7 has received identification information of the user through the communication unit 5, the registration unit 13 may store the finger length L in the storage unit 6 so as to be associated with the identification information of the user. Similarly, when the control unit 7 has received information indicating the type of the finger, the length of which has been measured by the control unit 7 (for example, the index finger, the middle finger, or the like) through the communication unit 5, the registration unit 13 may store the finger length L in the storage unit 6 so as to be associated with the information indicating the type of the finger.

(Input Processing)

The units related to the input processing are described below. The hand area detection unit 11 generates a binary image indicating a hand area, from a depth image, similar to the registration processing. In addition, the hand area detection unit 11 transmits the binary image to the provisional contact determination unit 14.

The provisional contact determination unit 14 is an example of a finger position identification unit, and obtains the position of a portion in the real space, which is included in the hand area, of a finger used for an input operation and the position in the read space of the finger base. At the time of execution of the input processing, the finger of the user, which is used for the input operation, approaches a reference object, so that it is probable that it is difficult to identify the fingertip of the finger on the depth image. Therefore, the provisional contact determination unit 14 executes processing similar to that of the finger length measurement unit 12, and identifies the contour point PT $(x_t,y_t)$ of the tip end portion of the finger used for the input operation and the finger base PB $(x_B,y_B)$ that are included in the hand area. The identified contour point PT $(x_t,y_t)$ is the tip end portion of the finger, which is identified on the depth image, so that, in the following description, the contour point PT $(x_t,y_t)$ is set as the provisional fingertip position.

Figure 9:
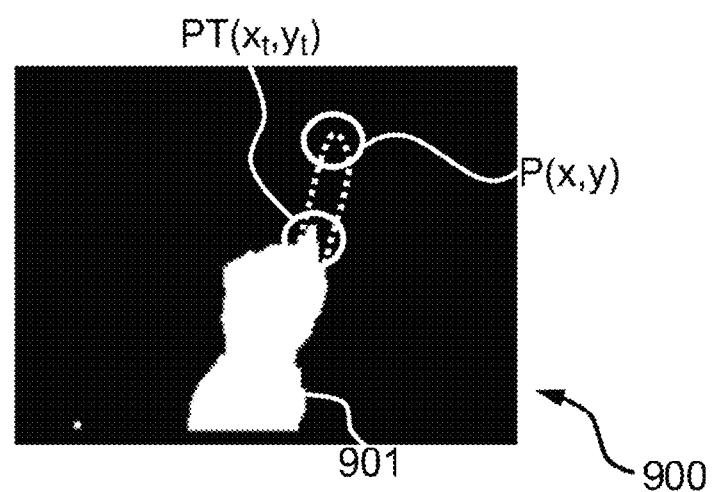
FIG. 9 is a diagram illustrating a relationship between a provisional fingertip position on the image and an estimated actual fingertip position.

FIG. 9 is a diagram illustrating a relationship between a provisional fingertip position on the binary image and an estimated actual fingertip position. Typically, when the user performs an input operation using the input device 1, the user causes not the finger base but the fingertip to approach the reference object. Therefore, even when it is difficult to identify the vicinity of the tip end of the finger in the depth image, it is probable that the finger base is identified. Thus, as indicated by the dotted line in a binary image 900, the hand area 901 does not include a part of the finger, but includes a portion close to the finger base. In addition, the provisional fingertip position PT $(x_t,y_t)$ is detected in the vicinity of the finger base, as compared with the actual fingertip position P(x,y).

The provisional contact determination unit 14 respectively obtain the positions in the real space, which correspond to the provisional fingertip position PT $(x_t,y_t)$ and the finger base PB $(x_B,y_B)$, from the values of the pixels corresponding to the provisional fingertip position PT $(x_t,y_t)$ and the finger base PB $(x_B,y_B)$ on the depth image. In addition, the provisional contact determination unit 14 obtains a distance from the reference object to the position of the provisional fingertip position PT $(x_t,y_t)$ in the real space, as the height of the provisional fingertip. At the time of an input operation by the user, the user causes the fingertip to approach the reference object, so that it is assumed that the height of the provisional fingertip is reduced. Thus, when the height of the provisional fingertip is less than the certain threshold value α, it is probable that the fingertip has come into touch with the reference object, that is, that the user has performed the input operation. Therefore, when the height of the provisional fingertip is less than the certain threshold value α, the provisional contact determination unit 14 notifies the fingertip position calculation unit 15 of the positions of the provisional fingertip position PT ($x_t$,$y_t$) and the finger base PB ($x_B$,$y_B$) in the real space. The threshold value α is set, for example, depending on measurement accuracy of the depth image camera 4. The threshold value α is set, for example, at the minimum value of a distance in which it is difficult to identify two objects at positions away from each other on the depth image. For example, the minimum value of a distance between the reference object and the hand, in which the hand is identified is obtained from a plurality of depth images obtained by imaging the hand using the depth image camera 4 while the distance between the reference object and the hand is changed, and the minimum value is set at the threshold value α.

When the height of the provisional fingertip is the certain threshold value α or more, it is assumed that the user does not perform an input operation. Therefore, in this case, the provisional contact determination unit 14 resets the provisional fingertip position PT ($x_t$,$y_t$) and the finger base PB ($x_B$,$y_B$). In addition, the provisional contact determination unit 14 executes the above-described processing when a depth image is obtained next time.

The fingertip position calculation unit 15 calculates, as the fingertip position P, the position far from the position of the finger base in the real space by the finger length L, in the longitudinal direction of the finger, which has been obtained from the position of a portion of the finger used for the input operation in the real space, which is included in the hand area, and the position of the finger base in the real space. In the embodiment, the fingertip position calculation unit 15 obtains a direction from the position of the finger base in the real space to the position of the provisional fingertip position in the real space as the longitudinal direction of the finger.

Figure 10:
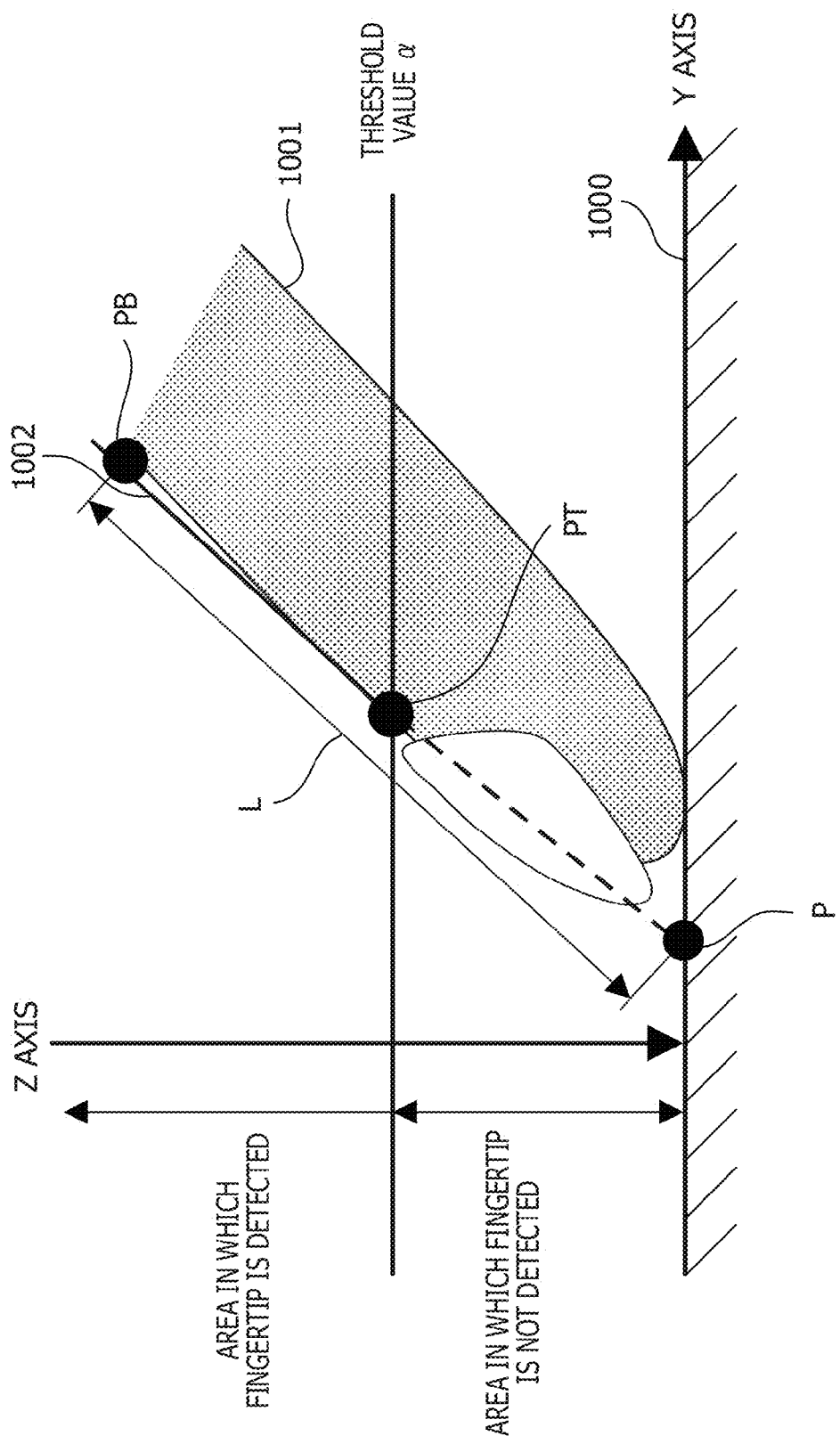
FIG. 10 is a diagram illustrating a relationship between the provisional fingertip position and the actual fingertip position, which is viewed from the side surface.

FIG. 10 is a diagram illustrating a relationship between a provisional fingertip position and an actual fingertip position, which is viewed from the side surface. In FIG. 10, the axis in the height direction in the real space, that is, the axis in the direction from the reference object to the depth image camera 4 is set as a Z axis. However, "Z=0" is satisfied at the position of the depth image camera 4. In addition, in the real space, an axis corresponding to the x axis and an axis corresponding to the y axis on the depth image that are orthogonal to the Z axis are respectively set as an X axis and Y axis. In the Z axis direction, an area close to a reference object 1000 as compared with the threshold value α is an area in which the fingertip is not detected, and an area far from the reference object 1000 as compared with the threshold value α is an area in which the fingertip is detected. Thus, in a finger 1001, the position at which the distance from the reference object 1000 is the threshold value α is detected as a provisional fingertip position PT. Here, it is typically difficult for the finger to come into contact with the reference object while the user merely bends the fingertip. Therefore, when the finger 1001 is extended outward straight, the actual fingertip position P is located on an extension line of a line 1002 connecting the finger base PB and the provisional fingertip position PT, which indicates the longitudinal direction of the finger, and is located away from the finger base PB toward the provisional fingertip position PT by the finger length L. Thus, the actual fingertip position P (PX,PY,PZ) in the real space is calculated by the following equation.

$$M(YZ) = \sqrt{(Y1-Y2)^2 + (Z1-Z2)^2}$$

$$M(XY) = \sqrt{(Y1-Y2)^2 + (X1-X2)^2}$$

$$PY = Y1 - \cos\theta_{yz} \cdot M(YZ)$$

$$PZ = Z1 - \sin\theta_{yz} \cdot M(YZ)$$

$$PX = X1 - \cos\theta_{xy} \cdot M(XY) \quad (3)$$

Here, "M (YZ)" is the length on a YZ plane in the real space, from the provisional fingertip position PT to the actual fingertip P, and "M (XY)" is the length on an XY plane in the real space, from the provisional fingertip position PT to the actual fingertip P. In addition, (X1,Y1,Z1) respectively correspond to an X axis coordinate, a Y axis coordinate, and a Z axis coordinate of the provisional fingertip position PT in the real space. In addition, (X2,Y2,Z2) respectively correspond to an X axis coordinate, a Y axis coordinate, and a Z axis coordinate of the finger base PB in the real space. In addition, "$\theta_{xy}$" indicates an angle between the X axis and a line from the provisional fingertip position to the finger base on the XY plane in the real space. Similarly, "$\theta_{yz}$" indicates an angle between the Y axis and a line from the finger base to the provisional fingertip position on the YZ plane in the real space.

The fingertip position calculation unit 15 notifies the contact determination unit 16 of the estimated actual fingertip position P (PX,PY,PZ) in the real space.

The contact determination unit 16 compares the coordinate PZ in the Z axis direction of the estimated actual fingertip position in the real space (that is, a distance from the depth image camera 4 to the fingertip position) with a contact determination threshold value D. The contact determination threshold value D is set as a distance from the depth image camera 4 to the reference object. In addition, the contact determination unit 16 determines that the fingertip have come into contact with the reference object when the PZ is the distance D or more. The contact determination threshold value D may set as a value obtained by subtracting a margin 13 corresponding to a measurement error from the distance from the depth image camera 4 to the reference object (for example, a few mm to 1 cm).

When the contact determination unit 16 determines that the fingertip has come into contact with the reference object, the contact determination unit 16 generates an input signal corresponding to the coordinates (PX,PY) on the XY plane of the fingertip position, and outputs the input signal to a further device through the communication unit 5.

Figure 11:
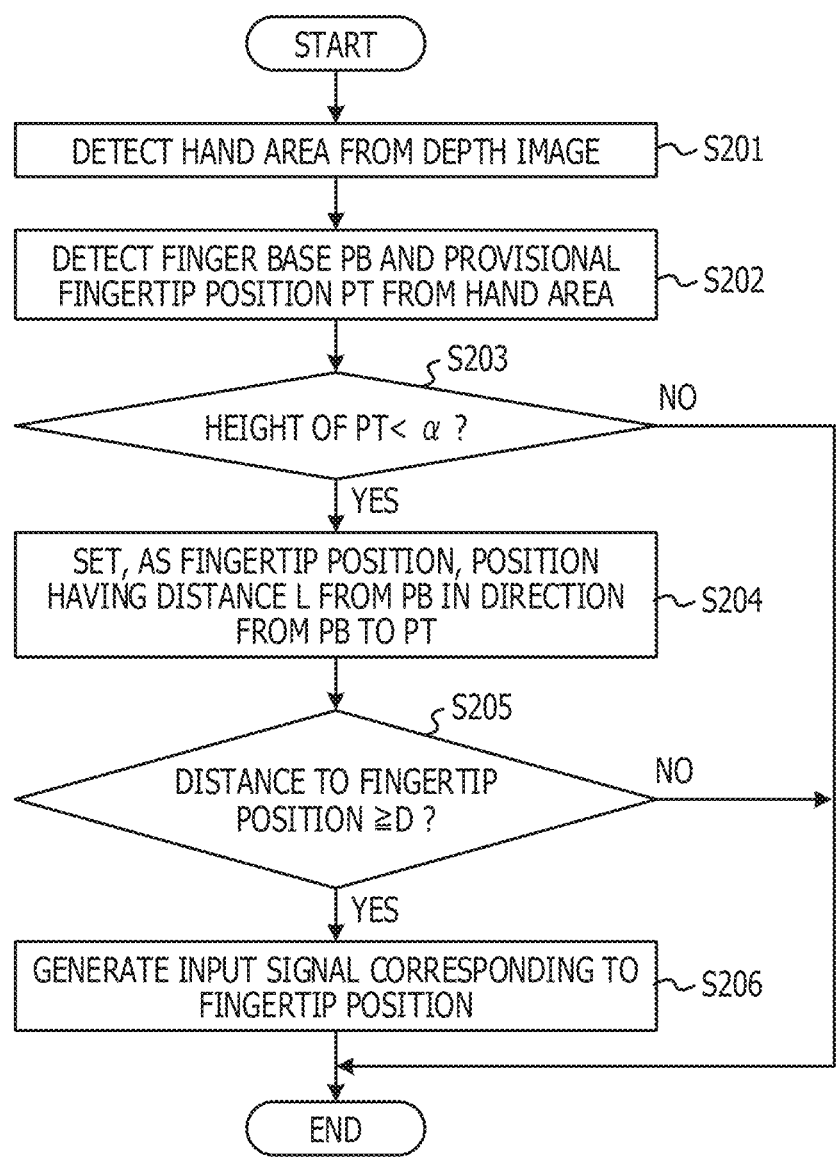
FIG. 11 is an operation flowchart illustrating fingertip position detection processing.

FIG. 11 is an operation flowchart illustrating the input processing including the fingertip position detection processing. Each time the control unit 7 obtains a depth image by the depth image camera 4, the control unit 7 executes the input processing in accordance with the following operation flowchart. In addition, in the following operation flowchart, Step S201 to S204 correspond to the fingertip position detection processing.

The hand area detection unit 11 detects a hand area that is an area in which the hand of the user appears in a depth image that has been obtained by the depth image camera 4, from the depth image (Step S201).

The provisional contact determination unit 14 detects the finger base PB of the finger of the user, which is used for an input operation, and the provisional fingertip position PT, from the hand area, and obtains the positions of the finger base PB and the provisional fingertip position PT in the real space (Step S202). In addition, the provisional contact determination unit 14 determines whether the height from the reference object to the provisional fingertip position PT is less than the certain threshold value α (Step S203).

When the height from the reference object to the provisional fingertip position PT is the certain threshold value α or more (No in Step S203), the provisional contact determination unit 14 determines that the finger of the user is not in contact with the reference object. In addition, the control unit 7 ends the input processing. When the height from the reference object to the provisional fingertip position PT is less than that the certain threshold value α(Yes in Step S203), the fingertip position calculation unit 15 obtains the fingertip position in the real space. For example, the fingertip position calculation unit 15 sets, as the fingertip position, the position away from the finger base PB in the direction from the finger base PB to the provisional fingertip position PT by the finger length L that is stored in the storage unit 6 (Step S204).

The contact determination unit 16 determines whether a distance PZ from the depth image camera 4 to the fingertip position is the contact determination threshold value D or more (Step S205). When the distance PZ is less than the contact determination threshold value D (No in Step S205), the contact determination unit 16 determines that the finger of the user is not in contact with the reference object. After that, the control unit 7 ends the input processing. When the distance PZ is the contact determination threshold value D or more (Yes in Step S205), the contact determination unit 16 determines that the finger of the user has come into contact with the reference object at the fingertip position. After that, the contact determination unit 16 generates an input signal corresponding to the coordinates of the fingertip position in the real space, and performs output of the input signal (Step S206). In addition, the control unit 7 ends the input processing.

As described above, such an input device may detect the fingertip position even when it is difficult to identify the finger of the user in the depth image obtained by imaging the finger of the user.

In a modification, as a reference point used to set the longitudinal direction of the finger used for an input operation, the provisional contact determination unit may obtain a further point in the portion of the finger, which is included in the hand area, instead of the provisional fingertip position. For example, the provisional contact determination unit may respectively identify contour points PL2 and PR2 at positions away from the left and right contour points PL and PR of the finger base PB, by a certain distance, along the contour of the finger, and may obtain the middle point of the two contour points PL2 and PR2, as the reference point used to set the longitudinal direction of the finger.

In a further modification, the input device may be installed on a desktop computer or a display integrated computer. In this case, for example, a depth image camera is installed on the upper part of the display included in the computer so as to face downward. In addition, the computer detects the fingertip position of the finger of the user, which has come into contact with the table on which the computer has been mounted, in accordance with each of the above-described embodiments and the modification. In addition, for example, the computer displays a cursor at the position on the display, which corresponds to the fingertip position of the user in order for the user to confirm the input.

In addition, a computer program that causes a computer to achieve each of the functions by the control unit of the input device according to each of the above-described embodiments and the modifications may be provided so as to be recorded to a computer readable medium such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input device comprising:
a memory configured to store a length of a finger of a hand from a fingertip of the finger to a base of the finger; and
a processor coupled to the memory and configured to
obtain a depth image that includes a hand and has pixel values corresponding to a distance from a camera to subjects provided between the camera and a reference object and including the hand,
detect a hand area that corresponds to the hand from among the subjects, from the depth image, identify a tip end of the hand area and a base of the finger,
identify a first three-dimensional position that corresponds to the tip end of the hand area and a second three-dimensional position that corresponds to the base, based on the pixel values of the depth image,
identify a direction from the second three-dimensional position to the first three-dimensional position,
identify a distance in a height direction from the reference object to the first three-dimensional position;
when the distance is less than a first threshold value, calculate, based on the direction and the length, a third three-dimensional position that corresponds to the fingertip of the finger which extends in the direction and is located between the tip end of the hand area and the reference object,
detect a press operation by the finger based on the distance,
generate an input signal according to the third three-dimensional position, and
when the distance is equal to or more than the first threshold value, reset the first three-dimensional position and the second three-dimensional position without calculating the third three-dimensional position.

2. The input device according to 1, wherein the processor is configured to:
generate the input signal based on positions in a vertical direction and in a horizontal direction in which the pixels are arrayed in the depth image when the press operation is detected, the positions corresponding to the third three-dimensional position.

3. The input device according to claim 2, wherein
the hand area is identified by comparing the depth image with another depth image, and
the another depth image includes an object on which the press operation is performed and does not include the hand.

4. The input device according to claim 3, wherein the processor is configured to identify, as the hand area, an area in which a difference between each pixel value in the depth image and each corresponding pixel value in the another depth image is equal to or more than a second threshold value.

5. The input device according to claim 4, wherein
the first three-dimensional position corresponds to a provisional fingertip position in a part of the finger included in a part of the hand area, and the third three-dimensional position corresponds to an actual fingertip position that is not identified to be the hand area as the difference is less than the second threshold value.

6. The input device according to claim 1, wherein the first three-dimensional position and the second three-dimensional position are determined based on positions in a vertical direction and in a horizontal direction in which each of the pixels are arrayed in the depth image, and the pixel values in the depth image.

7. A detection method executed by a computer, the detection method comprising:
acquiring a length of a finger of a hand from a fingertip of the finger to a base of the finger from a memory;
obtaining a depth image that includes the hand and has pixel values corresponding to a distance from a camera to subjects including the hand provided between the camera and a reference object and;
detecting a hand area that corresponds to the hand from among the subjects, from the depth image;
identifying a tip end of a hand area and the base of the finger;
identifying a first three-dimensional position that corresponds to the tip end of the hand area and a second three-dimensional position that corresponds to the base, based on the pixel values of the depth image;
identifying a direction from the second three-dimensional position to the first three-dimensional position;
identifying a distance in a height direction from the reference object to the first three-dimensional position;
when the distance is less than a first threshold value, calculating, based on the direction and the length, a third three-dimensional position that corresponds to a fingertip of the finger which extends in the direction and is located between the tip end of the hand area and the reference object;
detecting a press operation by the finger based on the distance;
generating an input signal according to the third three-dimensional position; and
when the distance is equal to or more than the first threshold value, reset the first three-dimensional position and the second three-dimensional position without calculating the third three-dimensional position.

8. The detection method according to 7,
wherein the input signal is generated based on positions in a vertical direction and in a horizontal direction in which the pixels are arrayed in the depth image when the press operation is detected, the positions corresponding to the third three-dimensional position.

9. The detection method according to claim 8, wherein the hand area is identified by comparing the depth image with another depth image, and
the another depth image includes an object on which the press operation is performed and does not include the hand.

10. The detection method according to claim 9, further comprising:
identifying, as the hand area, an area in which a difference between each pixel value in the depth image and each corresponding pixel value in the another depth image is equal to or more than a second threshold value.

11. The detection method according to claim 10, wherein the first three-dimensional position corresponds to a provisional fingertip position in a part of the finger included in a part of the hand area, and
the third three-dimensional position corresponds to an actual fingertip position that is not identified to be the hand area as the difference is less than the second threshold value.

12. The detection method according to claim 7, wherein the first three-dimensional position and the second three-dimensional position are determined based on positions in a vertical direction and in a horizontal direction in which each of the pixels are arrayed in the depth image, and the pixel values in the depth image.

13. A non-transitory storage medium storing a detection program which causes a computer to execute a procedure, the procedure comprising:
acquiring a length of a finger of a hand from a fingertip of the finger to a base of the finger from a memory;
obtaining a depth image that includes the hand and has pixel values corresponding to a distance from a camera to subjects provided between the camera and a reference object and including the hand;
detecting a hand area that corresponds to the hand from among the subjects, from the depth image;
identifying a tip end of the hand area and the base of the finger;
identifying a first three-dimensional position that corresponds to the tip end of the hand area and a second three-dimensional position that corresponds to the base, based on the pixel values of the depth image;
identifying a direction from the second three-dimensional position to the first three-dimensional position;
identifying a distance in a height direction from the reference object to the first three-dimensional position;
when the distance is less than a first threshold value, calculating, based on the direction and the length, a third three-dimensional position that corresponds to a fingertip of the finger which extends in the direction and is located between the tip end of the hand area and the reference object;
detecting a press operation by the finger based on the distance;
generating an input signal according to the third three-dimensional position; and
when the distance is equal to or more than the first threshold value, reset the first three-dimensional position and the second three-dimensional position without calculating the third three-dimensional position.

14. The non-transitory storage medium according to 13,
wherein the input signal is generated based on positions in a vertical direction and in a horizontal direction in which the pixels are arrayed in the depth image when the press operation is detected, the positions corresponding to the third three-dimensional position.

15. The non-transitory storage medium according to claim 14, wherein
the hand area is identified by comparing the depth image with another depth image, and
the another depth image includes an object on which the press operation is performed and does not include the hand.

16. The non-transitory storage medium according to claim 15, the procedure further comprising:
identifying, as the hand area, an area in which a difference between each pixel value in the depth image and each corresponding pixel value in the another depth image is equal to or more than a second threshold value.

17. The non-transitory storage medium according to claim 16, wherein
the first three-dimensional position corresponds to a provisional fingertip position in a part of the finger included in a part of the hand area, and
the third three-dimensional position corresponds to an actual fingertip position that is not identified to be the hand area as the difference is less than the second threshold value.

18. The non-transitory storage medium according to claim 13, wherein the first three-dimensional position and the second three-dimensional position are determined based on positions in a vertical direction and in a horizontal direction in which each of the pixels are arrayed in the depth image, and the pixel values in the depth image.

* * * * *